UNITED STATES PATENT OFFICE.

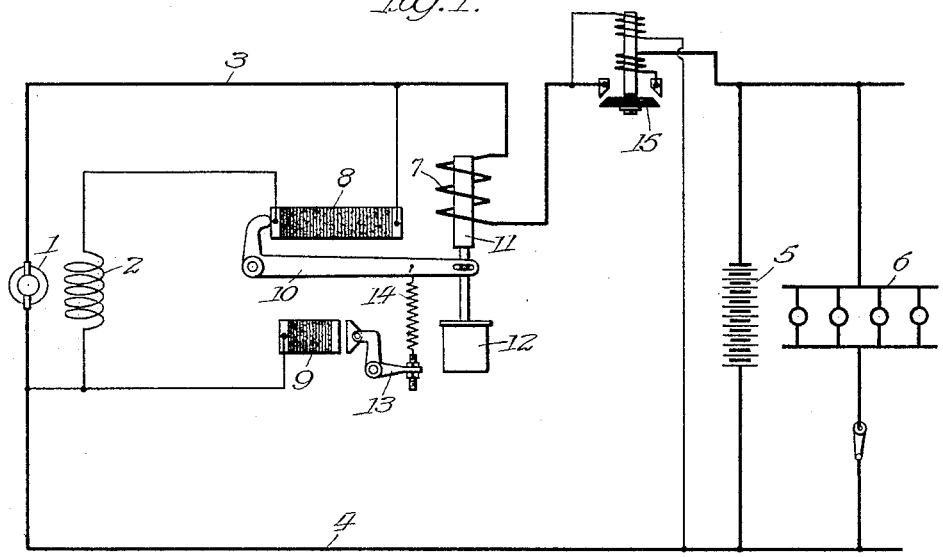
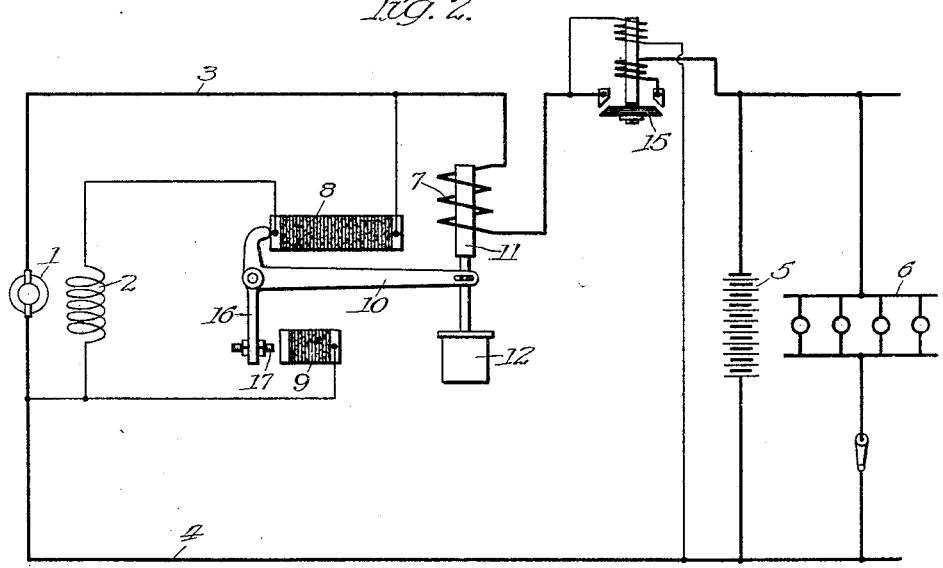

WILLIAM A. TURBAYNE, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

AUTOMATIC ELECTRIC REGULATOR.

1,182,231.  Specification of Letters Patent.  Patented May 9, 1916.

Application filed April 13, 1912. Serial No. 690,575.

*To all whom it may concern:*

Be it known that I, WILLIAM A. TURBAYNE, a citizen of the United States, residing at Buffalo, in the county of Erie and State of New York, have invented new and useful Improvements in Automatic Electric Regulators, of which the following is a full, clear, concise, and exact description, reference being had to the accompanying drawing, forming a part of this specification.

My invention relates to automatic electric regulators.

One of the objects of the invention is to provide an improved regulator which will operate efficiently through a very wide range of fluctuations in electrical conditions.

Another object is to provide a regulator in which the main regulating medium exercises the desired control up to a certain practical limit, beyond which the regulation is effected by other means.

An additional object is to provide means for obviating injurious arcing or burning of the electrodes in a regulator having contacting resistance elements maintained under varying pressure.

Further objects will be apparent.

I have illustrated diagrammatically in Figure 1, one embodiment of the invention. Fig. 2 illustrates a modification thereof.

The two forms of regulators illustrated are shown in connection with a car lighting system, which may be assumed, however, to be typical of any system in which the electrical conditions vary through a wide range. In a car lighting system the speed of rotation of the generator armature varies from zero to a rate corresponding to a train speed of sixty or possibly ninety miles an hour. Accordingly, generator regulators are provided which in some cases are designed to hold the generator voltage within predetermined limits and in other cases are designed to hold the generator current within predetermined limits.

I have selected for illustration a generator which is so regulated that the current delivered thereby may not exceed a certain predetermined value, although, of course, the regulation might be such as to maintain constant voltage as distinguished from constant current. The generator, which has an armature 1 and a shunt field winding 2, is connected across the mains 3, 4, and supplies current thereto and also to the storage battery 5 and lamps 6 connected across the external circuit in parallel branches. The generator regulator includes the series solenoid 7, the main regulating medium 8 and the auxiliary regulating medium 9. The series solenoid 7 is connected in the main circuit and responds to variations in current delivered by the generator. The main regulating medium 8 is connected in series with the shunt field winding 2 and regulates the strength of said field winding up to a certain practical limit, beyond which the auxiliary regulating medium 9 assumes control of the regulation. Said auxiliary regulating medium is connected preferably in a shunt circuit around the field winding 2 but in series with the main regulating medium 8.

The main regulating medium may, of course, assume various forms. In the present instance it assumes the form of a variable pressure rheostat, comprising a series of contacting resistance plates or electrodes which may be of carbon or other suitable material, and which are pressed together between suitable abutments, the resistance varying as the pressure varies. The auxiliary regulating medium 9 is also illustrated as a variable pressure rheostat, although of course it may assume other forms. The resistance of the main rheostat is normally a minimum, the carbons being normally maintained under compression by the bell crank lever 10 which is suitably attached to the plunger 11 of the solenoid 7, said plunger being normally in lowermost position due to its weight. When the solenoid 7 is energized the plunger 11 is raised and the bell crank lever 10 is moved to relax the pressure on the carbons and thereby increase the resistance in series with the shunt field winding 2. The movement of the plunger and associated parts is steadied by the dash pot 12.

The auxiliary resistance 9 is normally open circuited by the bell crank lever 13 which is attached to the bell crank lever 10 by a resilient connection or spring 14. The bell crank lever 13 is normally in the position shown, due to the weight of its horizontal arm. It may be moved, however, so as eliminate the small air gap and thereby close the circuit through the small variable pressure rheostat when its horizontal arm is raised by a sufficient upward movement of the plunger 11, the bell crank lever 10 and spring 14.

When the generator armature is at rest or is rotating slowly, the various movable parts are about as shown in the diagram. The automatic switch 15 is open whereby the generator is disconnected from the storage battery, the latter supplying the current necessary for the lamps 6. As the speed of armature rotation increases the generator voltage rises until after a predetermined value has been attained, the automatic switch closes and the generator supplies current to the system. If the speed of armature rotation continues to increase, the increased energization of the series solenoid 7 will cause additional resistance to be inserted in series with the generator shunt field winding, and thereby reduce the energization thereof sufficiently to maintain the current supplied by the generator at a predetermined constant value.

It is apparent that if the speed of armature rotation increases considerably beyond the point necessary for the generator to deliver current of the desired value, the regulating resistance will be increased to such a value that there will be a considerable voltage drop developed across said rheostat. With certain types of regulating mediums it is objectionable to have an excessive voltage drop developed across the same. This is particularly the case with a variable pressure rheostat such as illustrated, for the reason that in order to increase the resistance to the desired value the pressure on the carbons must be relaxed to such a degree that the carbons are not maintained in firm engagement with each other but become loose, and as a result arcing or burning of the contacts may occur. Before a sufficient movement of the bell crank lever has taken place to cause this undesirable relaxation of the pressure on the carbons, the bell crank lever 13 is caused to move about its pivotal point and closes a shunt circuit through the auxiliary rheostat 9. The slight continued upward movement of the plunger 11 causes an increased yielding pressure to be applied to the carbons which compose the auxiliary rheostat, and accordingly the resistance thereof is decreased as the current delivered by the generator tends to increase. The closing of this shunt circuit diverts current from the field winding 2 and accordingly weakens the same and causes a decrease in the current delivered by the generator. Although the shunt circuit around the field winding 2 is illustrated as being normally open, it is of course apparent that the requisite effect will be obtained if said shunt circuit is of sufficiently high resistance, whether actually open circuited or not. In either case the effect is such that, while the effective regulation is being accomplished by the main rheostat 8, little or no current is shunted around the field winding 2; but after said field winding has been weakened a certain amount, the further weakening thereof and consequently the effective regulation is accomplished by the auxiliary rheostat, which causes a decided decrease in the resistance of the shunt circuit around said field winding. It will be seen that after the effective regulation has been assumed by the auxiliary rheostat a given movement of the plunger 11 and bell crank lever 10 will result in a greater decrease in the energization of the field winding 2 than would occur if said reduction depended entirely on a continued relaxation in the pressure applied to the carbons of the main rheostat. In other words, the pressure on the carbons of the main rheostat is relaxed a moderate amount only, whereupon the generator field strength is reduced further with only a slight additional relaxation of said pressure and without permitting an undesirable looseness of the carbons, such as might result in arcing, burning or pitting of the carbon surfaces.

It should be noted that after the regulation is taken over by the auxiliary rheostat 9 the main rheostat 8 acts, in effect, as a fixed resistance in series with both the field winding 2 and the auxiliary rheostat 9. The regulation is now effected, as will be apparent, by varying the pressure applied through the spring 14 to the carbons of the rheostat 9, whereby more or less current is diverted around the field winding 2, and, accordingly, the regulation as a whole operates to maintain the generator current within the predetermined limit through a very wide range of speed of armature rotation. By adjusting the tension of the spring 14 or by varying the effective length of the different lever arms, it is apparent that the shifting of the regulation control from the main to the auxiliary rheostat may be made to take place at any desired point throughout the range of regulation. In the same manner the relative effectiveness of the auxiliary rheostat with respect to the main rheostat may be varied to meet varying requirements.

In Fig. 2 I have illustrated a modification of the mechanical connection between the bell crank lever 10 and the auxiliary rheostat 9. The pressure is applied to the carbons of the auxiliary rheostat through an additional arm or extension 16 on said bell crank lever, said arm being provided with an adjustable contact 17. This contact is adapted, upon predetermined upward movement of the plunger 11, to close the shunt circuit through the auxiliary rheostat 9, and also to apply an increasing pressure to the carbons comprising said rheostat, the general operation in effect being similar to that previously described. It is apparent that by varying the relative length of the arm 16 with respect to the other arms of the bell crank lever, a given movement of said bell crank lever may be made to cause any desired relative effect of the auxiliary rheostat as compared to the main rheostat.

It is to be noted, of course, that forms of regulating mediums other than variable pressure rheostats may be employed. This type of regulating means was selected merely for the purpose of illustration, although certain features of the operation result very beneficially with this type of regulating medium. Neither do I desire to limit myself to a constant current regulator as distinguished from a constant voltage regulator, nor do I limit myself to the system as a part of which the regulator has been illustrated. I desire, on the other hand, to cover broadly any suitable equivalent means for accomplishing the desired result which fall within the scope of the appended claims.

What I claim as new and desire to secure by Letters Patent of the United States is:

1. In an electric power system, a dynamo, a field winding for the dynamo, means comprising a variable pressure rheostat in series with said field winding for regulating the same, a coil responsive to a function of the dynamo output for controlling said regulating means, and means operated by said coil and acting upon a predetermined energization thereof to complete a shunt circuit around said field winding.

2. In an electric power system a dynamo, a field winding for the dynamo, means in series with said field winding for regulating the same, a coil responsive to a function of the dynamo output for controlling said regulating means, and means operated by said coil and acting upon a predetermined energization thereof to complete a shunt circuit around said field winding.

3. In combination, a variable pressure rheostat, a second variable pressure rheostat, and means for decreasing pressure on one of said rheostats, said means being effective to increase pressure on the other rheostat after the pressure on said first rheostat has been varied a predetermined amount.

4. Means for regulating the energization of an electric winding, said means including a regulating medium adapted to be connected in series with said winding to reduce the energization thereof, an auxiliary regulating medium adapted to be connected in shunt to said winding, and a common means for operating one of said mediums alone over a predetermined range and both of said mediums simultaneously over another predetermined range.

5. In combination with an electro-magnetic winding, means for regulating the excitation of said winding, said means including a variable resistance in series with said winding, a shunt circuit including a second variable resistance and means to complete said shunt around said winding at a predetermined stage in the operation of said regulator.

6. The combination of an electrical circuit, an auxiliary circuit adapted to be connected in parallel thereto, means for regulating the current in said first mentioned circuit comprising a variable resistance connected in series in said circuit to reduce the current therein, and means for reducing the resistance of said auxiliary circuit to further reduce the current in said first circuit, said means becoming effective after said variable resistance has been operated a predetermined amount.

7. A circuit to be regulated and regulating means therefor, said means including a regulating medium in series in said circuit, an electro-magnetic winding for controlling said medium, and means operated by said winding and acting upon a predetermined energization thereof to complete a circuit in shunt to said first circuit.

8. A generator field winding and means for controlling said winding, said means including a variable pressure rheostat for connection in series with said field winding, a controlling winding for varying the resistance of said rheostat, a shunt circuit adapted to be connected around said field winding and means for reducing the resistance of said circuit, said means operating after a predetermined operation of said rheostat.

9. A winding and means for regulating said winding, said means including a variable pressure rheostat for connection in series with said winding, a controlling winding for varying the resistance of said rheostat, mechanical connections whereby said controlling winding may vary the pressure applied to said rheostat, a shunt circuit adapted to be connected around said first winding.

10. A generator regulator comprising a series of contacting resistance elements, a bell crank lever for varying the pressure applied thereto, a plunger connected with said bell crank lever, a current responsive solenoid for operating said plunger, a second series of contacting resistance elements, and mechanical connections between said second series and said bell crank lever, whereby the pressure applied to one series of contacting resistance elements is increased while the pressure applied to the other series of contacting resistance elements is relaxed, said two series of resistance elements being connected in series.

11. A generator regulator having a variable pressure rheostat, a bell crank lever therefor which normally applies a maximum pressure to said rheostat, an auxiliary variable pressure rheostat, and a loose connection between the same and said bell crank lever, whereby a movement of said bell crank lever in a direction to relax the pressure on said first variable pressure rheostat causes an increase in the pressure applied to said auxiliary rheostat after a predetermined movement of said bell crank lever has taken place.

12. In combination, a generator having a shunt field winding, a main variable pressure rheostat in series with said shunt field winding, an auxiliary variable pressure rheostat in a shunt circuit around said field winding and in series with said main rheostat, a controlling winding common to both of said rheostats, and means whereby said winding may operate said rheostats, the resistance of said main rheostat being normally a minimum and the resistance of said auxiliary rheostat being normally a maximum, whereby the energization of said controlling winding causes an increase in the resistance of said main rheostat to decrease the energization of said field winding, and a further increase in the energization of said controlling winding causes a decrease in the resistance of said auxiliary rheostat, thereby diverting current from said field winding and reducing further the energization thereof.

13. In combination, an electro-magnetic winding, two variable pressure rheostats for controlling the energization thereof, one of said rheostats being connected in series therewith and the other of said rheostats being connected in a shunt circuit around said winding but in series with said first rheostat, a controlling solenoid and a plunger therefor, and mechanical connections from both of said rheostats to said plunger, whereby a given movement of said plunger, due to the initial energization of said solenoid, causes said first rheostat to control the energization of said electro-magnetic winding, and whereby a further movement of said plunger causes said second rheostat to assume the control thereof.

14. In combination, a generator having a shunt field winding, a variable resistance in series with said shunt field winding, a second variable resistance around said shunt field winding, and means for simultaneously varying both of said resistances, whereby the predominating regulation is effected by said second variable resistance under certain conditions, and means for open-circuiting said second resistance under predetermined conditions.

15. A car lighting system including a generator having a shunt field winding, a main circuit supplied thereby, a variable pressure rheostat in series with said shunt field winding, a current responsive coil connected in series in said main circuit for operating said variable pressure rheostat, a shunt circuit around said shunt field winding, and means in said shunt circuit controlled by said current responsive winding for decreasing the resistance of said shunt circuit when a predetermined variation of said variable pressure rheostat has been accomplished, thereby preventing an undesirable relaxation in the pressure applied to said variable pressure rheostat as the generator current tends to increase beyond a certain value.

16. In a system of electrical regulation, a coil to be regulated, a regulating medium in series therewith, an electro-magnetic winding for controlling said medium, and a shunt circuit adapted to be completed around said coil, said electro-magnetic winding acting, when energized below a predetermined point, to control said medium and when energized above said predetermined point to complete said shunt circuit.

17. In a system of electrical regulation, a coil to be regulated, a regulating medium in series therewith, an electro-magnetic winding for controlling said medium, and a shunt circuit adapted to be completed around said coil, said electro-magnetic winding acting, when energized below a predetermined point, to control said medium and when energized above said predetermined point to complete said shunt circuit and thereafter to control the resistance of said shunt circuit.

18. In a system of electrical regulation, a coil to be regulated, a regulating medium in series therewith, a shunt circuit adapted to be completed around said coil, a regulating medium for said shunt circuit, and an electro-magnetic winding controlling said series regulating medium and acting upon a predetermined energization to complete said shunt circuit.

19. In a system of electrical regulation, a coil to be regulated, a regulating medium in series therewith, a shunt circuit adapted to be completed around said coil, a regulating medium for said shunt circuit, and an electro-magnetic winding controlling said series regulating medium and acting upon a predetermined energization to complete said shunt circuit and thereafter control said shunt regulating medium.

20. In an electric power system, a dynamo, a field winding for the dynamo, means comprising a variable pressure rheostat in series with said field winding for regulating the same, a coil responsive to a function of the dynamo output for controlling said regulating means, means operated by said coil and acting upon a predetermined energization thereof to complete a shunt circuit around said field winding, and means for varying the point at which said coil will complete said shunt circuit.

21. In combination, a variable speed shunt wound generator, a regulating medium in series with the shunt field thereof, a shunt circuit adapted to be completed around said shunt field, a resistance in said shunt circuit, a controlling winding adapted to vary said regulating medium, and means actuated by said winding to decrease the resistance of said shunt circuit, said means acting after a predetermined variation in said regulating medium has been effected.

In witness whereof, I have hereunto subscribed my name in the presence of two witnesses.

WILLIAM A. TURBAYNE.

Witnesses:
E. J. HANNIG,
F. J. CALLAHAN.

Copies of this patent may be obtained for five cents each, by addressing the "Commissioner of Patents, Washington, D. C."